United States Patent [19]
Bryan

[11] Patent Number: 5,188,797
[45] Date of Patent: Feb. 23, 1993

[54] EXTENDED WELD TAB FOR FUEL ASSEMBLY GRID

[75] Inventor: William J. Bryan, Granby, Conn.

[73] Assignee: Combustion Engineering, Inc., Windsor, Conn.

[21] Appl. No.: 694,807

[22] Filed: May 2, 1991

Related U.S. Application Data

[63] Continuation-in-part of Ser. No. 679,784, Apr. 3, 1991.

[51] Int. Cl.⁵ .................................. G21C 3/34
[52] U.S. Cl. .................................. 376/438; 376/462; 376/441
[58] Field of Search ............... 376/462, 438, 442, 451, 376/441; 976/DIG. 78, DIG. 79, DIG. 81

[56] References Cited

U.S. PATENT DOCUMENTS

| | | | |
|---|---|---|---|
| 3,607,640 | 9/1971 | Krawiec | 376/442 |
| 4,089,741 | 5/1978 | Patterson et al. | 376/439 |
| 4,492,844 | 1/1985 | Kobuck et al. | 219/121 LC |
| 4,683,115 | 7/1987 | Frömel et al. | 376/439 |
| 4,725,402 | 2/1988 | Krawiec | 376/438 |
| 4,879,090 | 11/1989 | Perrotti et al. | 376/462 |
| 5,139,736 | 8/1992 | Bryan | 376/442 |

Primary Examiner—Donald P. Walsh
Assistant Examiner—Meena Chelliah
Attorney, Agent, or Firm—Chilton, Alix & Van Kirk

[57] ABSTRACT

Grid strips for a nuclear fuel assembly grid have elongated weld tabs. The weld tabs are bent against the strips along the intersection with an adjacent orthogonal strip. The tabs are dimensioned and positioned to initially extend substantially the entire length of the intersection of two grid strips. The tabs are then melted during the welding process.

14 Claims, 4 Drawing Sheets

EXTENDED WELD TAB FOR FUEL ASSEMBLY GRID

This application is a continuation-in-part of copending application Ser. No. 679,784, filed Apr. 3, 1991, entitled "Fuel Assembly Support Grid".

BACKGROUND OF THE INVENTION

The present invention relates to nuclear reactor fuel assemblies and more particularly to a fuel assembly grid designed to improve fuel rod support, strength, and reactor performance.

It is well known that the nuclear fuel for heterogeneous nuclear reactors is in the form of fuel elements or rods which are grouped together in side-by-side assemblies or bundles. These fuel assemblies also include fixed rods containing burnable poisons and hollow tubes through which control element assemblies are arranged to pass. The liquid moderator-coolant, normally water, flows upwardly through the reactor core in channels or longitudinal passageways formed between the fuel rods and fuel assemblies.

One of the operating limitations on current reactors is established by the onset of film boiling on the surfaces of the fuel element rods. The phenomenon is commonly referred to as departure from nucleate boiling (DNB) and is affected by the fuel element spacing, system pressure, heat flux, coolant enthalpy and coolant velocity. When DNB occurs, there is a rapid rise in the temperature of the fuel element due to the reduced heat transfer, which can ultimately result in failure of the element. Therefore, in order to maintain a factor of safety, nuclear reactors must be operated at a heat flux level somewhat lower than that at which DNB occurs. This margin is commonly referred to as the "thermal margin".

Nuclear reactors normally have some regions in the core which have a higher neutron flux and power density than other regions. This situation may be caused by a number of factors, one of which is the presence of control rod channels in the core. When the control rods are withdrawn, these channels are filled with moderator which increases the local moderating capacity and thereby increases the power generated in the fuel. In these regions of high power density known as "hot channels", there is a higher rate of enthalpy rise than in other channels. It is such hot channels that set the maximum operating conditions for the reactor and limit the amount of power that can be generated because the critical thermal margin is first reached in these channels.

Attempts have been made in the past to solve these problems and increase DNB performance by incorporating integral flow deflector vanes into the support grid structures employed to contain the members of the fuel assembly. These vanes can improve performance by increasing coolant mixing and fuel rod heat transferability downstream of the vanes. These attempts to improve performance have met with varying success depending on the vane design and the design of other grid components which can impact the effectiveness of vanes. To maximize the benefit of the vanes, the size, shape, bend angle, and location of the vanes must be optimized. The vanes are especially beneficial adjacent to the hot channels. The remaining components of the grid which include the strips, rod support features and welds must be streamlined to reduce the turbulence generated in the vicinity of the vanes. Further constraints on designing the grids include minimizing grid pressure drop and maximizing grid load carrying strength.

Grids are generally of egg-crate configuration and are spaced longitudinally along the fuel assembly to provide support for the fuel rods, maintain fuel rod spacing, promote mixing of coolant, provide lateral support and positioning for fuel assembly guide tubes, and provide lateral support and positioning for the instrumentation tube. The grid assembly usually consists of individual strips that interlock to form a lattice. The resulting square cells provide support for the fuel rods in two perpendicular planes. In general, each plane has three support points: two support arches and one spring. The springs and arches are stamped and formed in the grid strip and thus are integral parts of the grid assembly. The springs exert a controlled force, preset so as to optimally maintain the spring force on the fuel rod over the operating life of the fuel assembly.

Fuel assemblies employing spacer grids with flow deflector vanes have usually been fabricated substantially or entirely of inconel or a zirconium alloy, i.e., zircaloy. The inconel grid employing a brazed intersection connection has the advantage of greater strength because of the higher strength of inconel and because the brazing process bonds the intersection of the strips along its entire length. Brazing also has the advantage of providing little or no obstruction to flow. Due to the increased strength, the strip thickness of an inconel grid can be reduced relative to the zircaloy grid to reduce pressure drop and turbulence in the vicinity of the vanes. Annealed zircaloy has commonly been used as a grid material because of its low neutron capture cross-section. A low neutron capture cross-section makes nuclear fission more efficient, thus making the nuclear reactor operate more economically. However, to achieve a strength equivalent to that of an inconel grid, the strip thickness for a zircaloy grid must be increased, thus creating more turbulence and higher pressure drop. Additionally, the joining of the interlocking zircaloy strips conventionally requires welding which melts some grid material to form a weld nugget. The increased strip thickness and weld nuggets for conventional zircaloy grids increase turbulence and grid pressure drop and reduce the effectiveness of the vanes. Therefore, the DNB performance of a zircaloy grid containing flow vanes is degraded relative to an inconel grid vane design.

Co-pending U.S. Patent application No. 679,784, filed Apr. 3, 1991, the disclosure of which is hereby incorporated by reference, discloses providing intermediate welds to improve the strength of the zircaloy grid. Small welding tabs are formed in the grid strips to facilitate the welding process. The slots may be tapered at their ends to facilitate welding at intermediate vertical locations on the strip; thus improving grid strength. Tests have shown an increase in strength of approximately 15% for each intermediate weld over conventional zircaloy grids without intermediate welds. If required, the grid may be welded at three intermediate points, thus increasing its strength by 45% over prior art grids.

SUMMARY OF THE INVENTION

It is an object of the present invention to provide a modification to a grid containing flow vanes, for improving reactor performance, fuel rod support, load carrying strength, pressure drop, and handling performance.

More particularly, the invention is directed to a grid strip for a nuclear fuel assembly wherein the strip comprises a panel of substantially uniform thickness having opposed first and second edges and a medial centerline. A plurality of locking slots extend from the first edge to approximately the centerline. The slots are substantially parallel and equidistantly spaced. At least one weld tab associated with at least one slot intergally extends from the panel. The tab is disposed adjacent the slot. The tab preferably has a longitudinal dimension which is at least equal to one-fourth the distance between adjacent slots.

The grid strip has openings wherein elongated weld tabs partially define the openings and the slots. The weld tabs preferably have a longitudinal dimension which is at least one-half the diameter of the opening. In a preferred embodiment, two pairs of interior weld tabs project from upper and lower edges of the opening. A second pair of elongated tabs may project at the second edge of the panel. The tabs are configured so that their terminal ends essentially align with the terminal ends of associated bifurcated vane structures which project at the second edge. In one embodiment, pairs of weld tabs extend laterally away from the slot a distance which is approximately equal one-half the distance between adjacent slots.

A method for constructing a nuclear fuel assembly grid of the type which employs a plurality of interior strips of substantially equal generally uniform thickness which are slotted and orthogonally interengaged to define a plurality of fuel support cells comprises forming a type A strip having a plurality of slots extending from the lower edge to approximately the strip longitudinal centerline. The type A strip comprises a projecting elongated tab which intergrally extends adjacent at least one of the slots. A type B strip, having a plurality of slots extending from the upper edge to approximately the strip longitudinal centerline, comprises a projecting elongated tab which integrally extends adjacent at least one slot. The type A strips and the type B strips are orthogonally engaged by congruent overlapping of the respective slots. The tabs are then bent so as to engage the respective strips adjacent to the intersection with the orthogonal strip. The tabs are welded to interlock the type A and type B strips. The bent tabs may form an elongated structure which extends substantially the entire intersection of an engaged type A strip and an engaged type B strip. The tabs are then melted during welding to form weldments of the assembly grid.

Thus, in accordance with the invention, the crush strength of a reactor assembly spacer grid is increased. This increase is principally attributable to the improved welding of the interlocking interior grid strips due to the elongated tabs. The intersections of the internal strips in accordance with the present invention, are characterized by a weld seam of substantially greater length which is less resistant to coolant flow than has previously been employed with standard nugget welds. By eliminating the weld nugget, flow turbulence generated by the nugget below the vane is reduced thus increasing vane performance. The increased weld seam length also enhances the strength of the grid and thus allows the grid strip thickness to be reduced. Tests have shown that a reduction of 20 to 30% can be achieved without a reduction of grid crush strength.

BRIEF DESCRIPTION OF THE DRAWINGS

These and other objects and advantages of the invention will be described more fully below with reference to the accompanying drawings of the preferred embodiment, in which.

DETAILED DESCRIPTION OF THE PREFERRED EMBODIMENT

Figure 1:
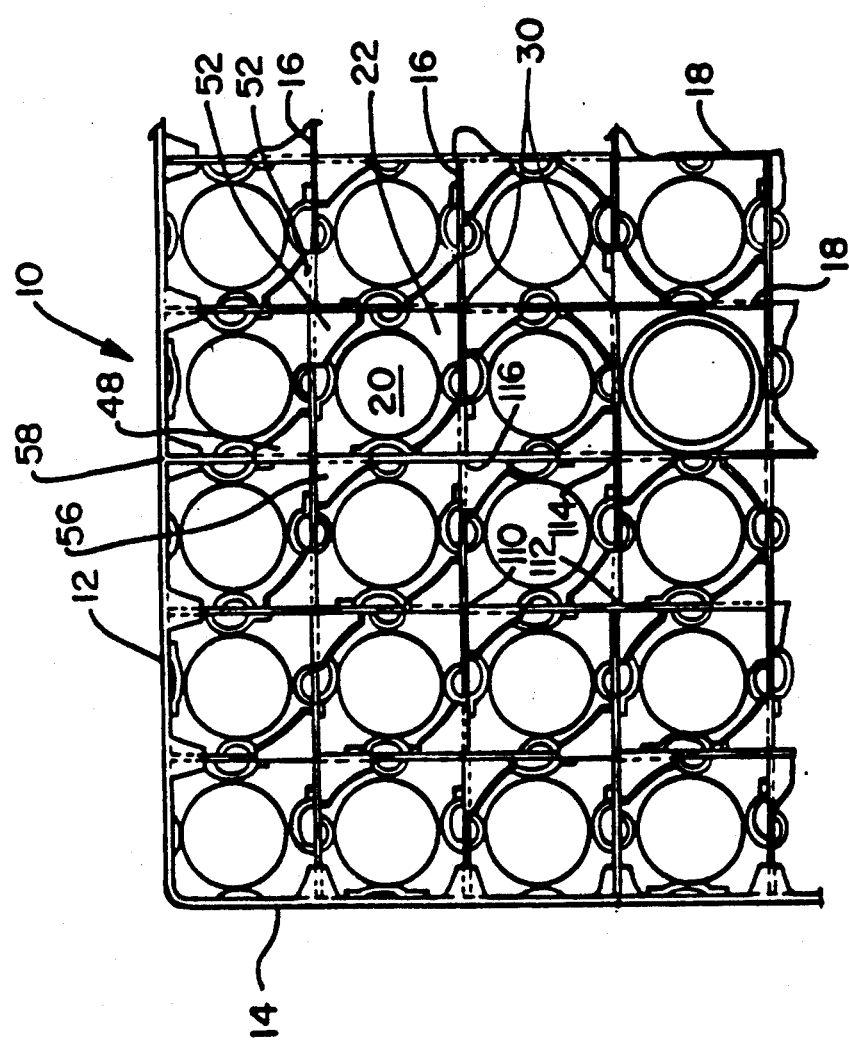
FIG. 1 is a top plan view of a portion of an improved spacer grid which embodies the present invention.

FIG. 1 shows a nuclear fuel assembly grid 10 for use in a fuel assembly of the type shown in U.S. Pat. No. 4,879,090, the disclosure of which is hereby incorporated by reference. The assembly has opposed perimeter strips 12 oriented left to right in FIG. 1 (only one shown) and opposed perimeter strips 14 extending top to bottom (only one shown), all four of 9 which define a rigid, generally square envelope. A plurality of interior grid strips 16 running from right to left, and a similar plurality of grid strips 18 running from top to bottom, are interconnected to each other in egg-crate fashion, and are connected at their opposed ends to respective perimeter strips 14,12. For convenient reference, the perimeter strips 12 and internal strips 16, will be designated type A, whereas the perimeter strips 14 and similarly oriented grid strips 18, will also be designated type B.

The grid 10 thus defines a regular array of cells 22, through which a fuel rod 20 passes in the direction toward and away from the viewer of FIG. 1. The interengaged grid strips 16,18 form four walls which define the cell 22 and which carry the fuel rod support structure.

Figure 2:
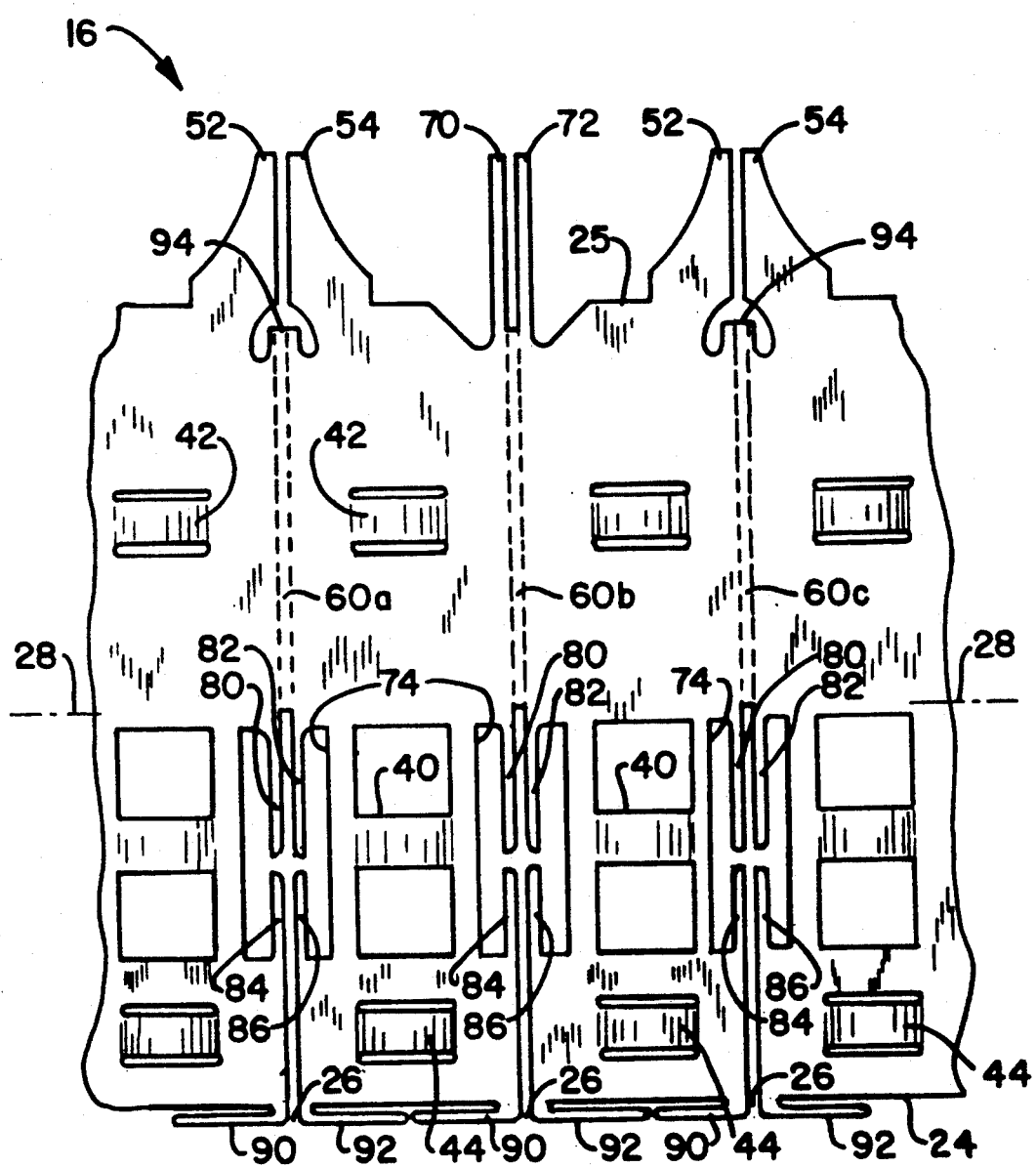
FIG. 2 is a partial elevational view of the type A grid strips oriented from left to right in FIG. 1, prior to fabrication of the grid.
Figure 3:
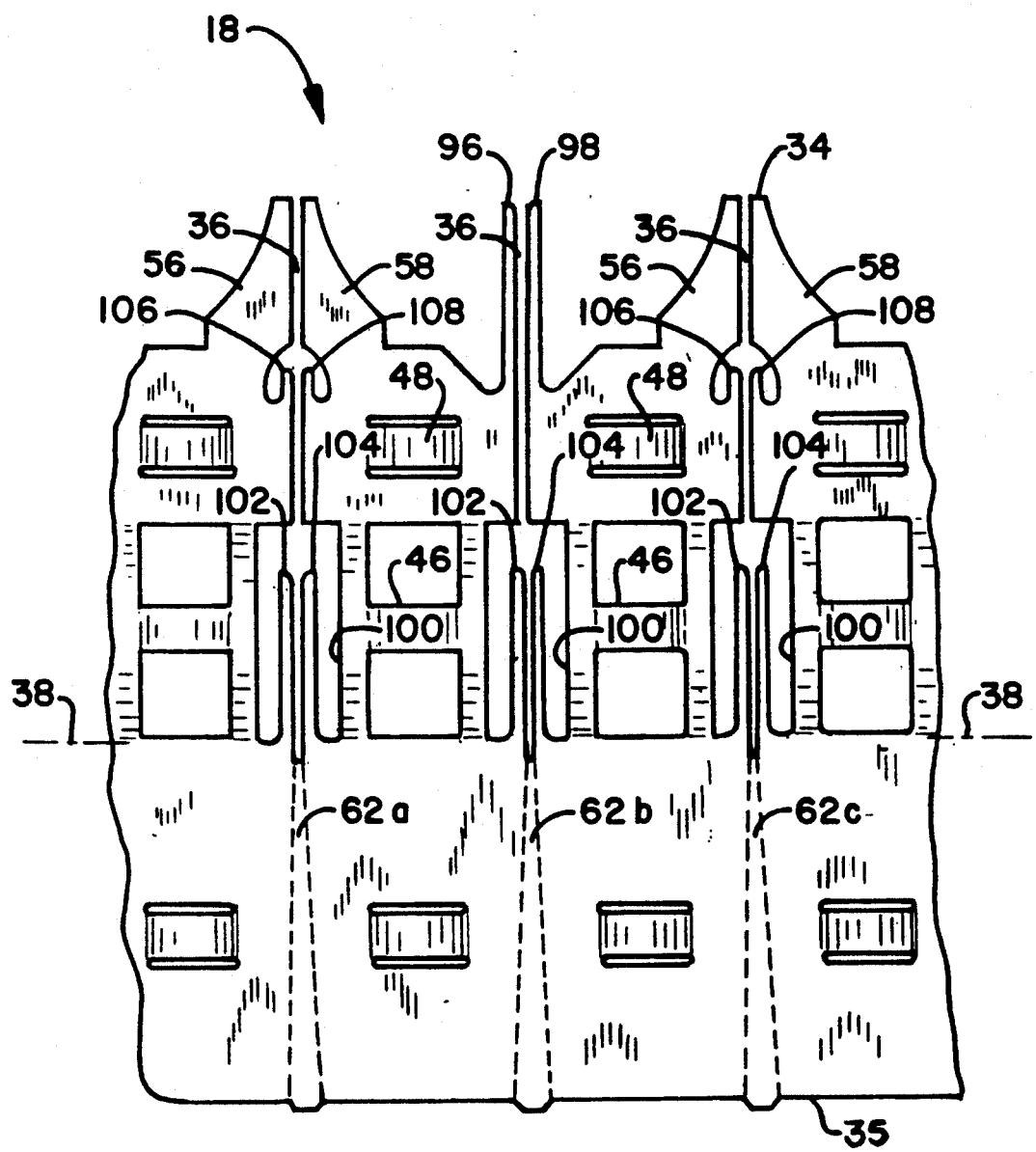
FIG. 3 is a partial elevational view of the type B grid strips oriented from top to bottom in FIG. 1, prior to fabrication of the grid.

FIGS. 2 and 3 show portions of grid strips 16 and 18, respectively, at a point in time at which the grid strips have been stamped and cut from sheets of zircaloy, inconel or other suitable material, and are ready for interengagement in egg-crate fashion. Grid strip 16 has an irregular shaped lower edge 24 and an opposed irregular shaped upper edge 25 as will be described below. A plurality of vertical slots 26 extend from the lower edge 24 of the strip toward the strip longitudinal mid-line 28. Grid strip 18 has an irregular shaped upper edge 34 and an opposed lower edge 35. Slots 36 extend from the upper edge 34 downwardly toward the longitudinal mid-line 38. In fabricating the grid, strip 18 would be rotated 90° into and out of the plane of the paper, whereupon grid strip 16 would be lowered thereon, such that slots 26 pass vertically through respective slots 36. This interengagement continues until all the interior strips 16,18 are interengaged and welded as detailed below, whereupon the perimeter strips 12,14 are welded to the opposed ends thereof.

Referring now to FIGS. 1, 2 and 3, the overlapped, congruent slots 26,36 define a corner 30 of cell 22. The cell 22 has two walls defined by type A grid strips 16 and two walls defined by type B grid strips 18. The fuel rod support structure is carried by the cell walls. On grid strips 16 shown in FIG. 2, spring member 40 projects upwardly from the plane of the drawing, whereas integrally formed upper and lower arches 42,44 project away from the viewer. The spring member 40 and the arch 44 are both below the mid-line 28 of strip 16. On strip 18, spring member 46 projects upwardly from the plane of the paper, whereas upper arch 48 and lower arch 50 project away from the viewer. On strip 18, the spring 46 and the upper arch 48 are both substantially above the mid-line 38 of the strip.

The strips 16,18 carry vane structures 52,54 and 56,58, respectively, which, after interengagement of the strips into egg-crate fashion and welding together of the strips, are bent toward the interior of the cells for the purpose of promoting cross-flow of the coolant during reactor operation. The vane structures 52,54 and 56,58 are opposed pairs of nose-like projections which initially terminate in aligned upper segments. After the strips 16,18 have been interengaged to form the egg-crate and welded together and the vanes bent, the vane 52 shown in FIG. 2 is located in the upper right portion of cell 22 shown in FIG. 1. In FIG. 1, vane 54 is associated with grid strip 16 defining the opposed wall of cell 22. Vanes 56 and 58 shown in FIG. 3, appear at 56 and 58 as projecting into neighboring cells as shown in FIG. 1.

The interengagement of the strips 16,18 during fabrication is initially rather loose, and requires welding to provide sufficient structural rigidity to the grid, as well as sufficient rigidity to the integral fuel rod support structure. As shown in FIGS. 2 and 3, the vertical line of intersection of grids 16 and 18 would be along respective vertical sections 60a, 60b, 60c,...and 62a, 62b, 62c,.... As observed from top to bottom along section 60b (and alternating sections 60), the strip 16 includes a pair of upwardly projecting elongated weld tabs 70,72 at the upper edge 25. The weld tabs 70,72 are separated by a distance commensurate with the thickness of interlocking grid strip 18 and the width of section 60b. Weld tabs 70,72 terminate at approximately the same vertical height as vane structures 52,54. The longitudinal dimensions (vertical) of weld tabs 70,72 are at least one-fourth the traverse dimensions between adjacent slots 36.

With respect to sections 60a, 60b, 60c..., interior opposed pairs of elongated weld tabs 80,82 and 84,86 are formed so as to project vertically from upper and lower edges of cutout 74. The respective tabs of each pair 80,82 and 84,88 are congruent and are separated a distance commensurate with the thickness of interlocking grid strip 18. The longitudinal dimensions (vertical) of weld tabs 96,98 are at least one-fourth the transverse dimensions between adjacent slots 36. In addition, an elongated pair of congruent weld tabs 90,92 at the lower edge 24 extend transversely in opposing directions from slots 26. The proximal portions of the tabs 90,92 are also separated by a distance commensurate with the thickness of interlocking grid strip 18. In addition, with respect to alternating sections 60a, 60c..., the adjacent parallel sections have associated truncated weld tabs 94.

With reference to FIG. 3, the section 62b (and the alternating sections) have an associated weld tab structure comprising upwardly projecting elongated weld tabs 96,98 at or adjacent the upper edge 34. Associated with each of sections 62a, 62b, 62c... are interior elongated congruent tabs 102,104 projecting from the lower edge of cutout 100. The tabs of pairs 96,98 and 102,104 are separated by a distance which is substantially commensurate with the thickness of the interlocking strip 16 and the width of sections 62. Weld tabs 96,98 terminate at approximately the same vertical height as vane structures 56,58. In addition, truncated weld tabs 106,108 may also be provided adjacent slots 36 at locations slightly below the vane structures 56,58.

Figure 4:
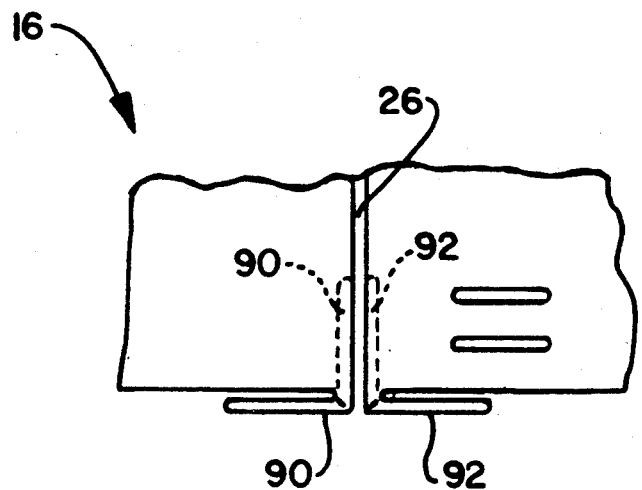
FIG. 4 is an enlarged fragmentary elevational view, partly in schematic, of the type A grid strip of FIG. 2.
Figure 5:
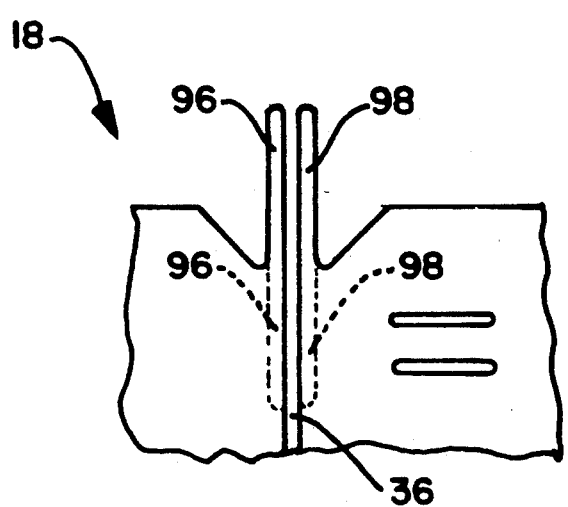
FIG. 5 is an enlarged fragmentary elevational view, partly in schematic, of the type B grid strip of FIG. 3.

With reference to FIGS. 4 and 5, the egg-crate structure in accordance with the present invention, is fabricated by interengaging the respective strips 16 and 18 along their associated slots 26,36 so as to form the egg-crate structure. The elongated weld tabs are then bent against the panel portions along the interlocking or interengaging paths of the adjacent respective strips 16 or 18 as illustrated by the phantom lines in FIGS. 4 and 5. The folded weld tabs are essentially consumable tabs that provide an elongated weld seam which constitutes part of the completed weld nugget. The tabs essentially produce a weld seam which extends the entire intersection length of the interengaged strip 16,18 at each corner thereof, for example, corner seams 110,112, 114 and 116 illustrated in FIG. 1. After the tabs are bent over, they are then welded by use of either a single or split laser beam which essentially melts the tab into a fillet so as to constitute a filler metal interconnecting the interlocking grid strips.

For some applications, not all of the extended tabs may be required. For example, the extended tabs may only be used at the top or bottom portions of the egg-crate assembly. Alternately, rather than the tab pairs, as described and illustrated in the drawings, only a single weld tab may be employed for each intersection of an associated grid and grid strip 16,18 Preferably, the weld tabs may be employed to provide substantially continuous uniform weld seam along the entire interlocking intersection of the grid strips.

It should be appreciated that the elongated tab functions to provide a weld between the interlocking strips which weld is stronger and less resistant to coolant flow than the standard nugget weld.

The elongated tabs provide a combination of advantages not previously available in this art. In particular, the cutouts 46 and 100 define, and provide easy access to, weld tabs 80, 82, 84, 86 and 102, 104, which contribute metal toward the formation of strong and rigid weld nuggets such as at corner 110, 112, 114, and 116 as shown in FIG. 1. The cutouts 46 and 100 also promote cross cell coolant mixinq through the corners, which was not previously available in the prior art. These advantages are achieved while retaining relatively rigid, uninterrupted strip surfaces which maintain the ability of the strips 16 and 18 to resist impact and other loads imposed on perimeter strips 12 and 14, for example, and transferred to the strips 16 through the transversely oriented strips 18. The elongated tabs contribute to elongated weld seams to thereby enhance the structural integrity of the grid.

In effect, the slots 26,36 are only slightly larger than the widths of strips 16 and 18. The weld tabs are each approximately the same thickness as the respective slots 26,36. The tabs are longitudinally dimensioned to extend substantially the entire vertical lengths of the sections 60,62.

What is claimed is:
1. A grid strip for constructing a nuclear fuel assembly grid comprising:

a panel of substantially uniform thickness having opposed first and second edges and a medial centerline thereto;

slot means for defining a plurality of locking slots extending from said first edge to approximately said centerline, said slots being substantially parallel and equidistantly spaced;

weld tab means comprising at least one weld tab associated with at lest one slot and integrally extending from said panel, said at least one tab being disposed adjacent said slot, said weld tab having an elongated strip-like configuration defined by a pair of substantially parallel edges extending substantially the longitudinal length thereof and having a longitudinal dimension which is at least equal to one-fourth the distance between adjacent slots.

2. The grid strip of claim 1 further comprising opening means defining at least one opening having a vertical diameter and an elongated weld tab having a longitudinal dimension which is approximately one half said diameter or greater, said weld tab means partially defining said opening and said slot.

3. The panel of claim 2 wherein at least one said opening is defined by an upper edge and a lower edge, and said grid strip comprises two pairs of interior weld tabs, one pair projecting from the upper opening edge and the other from the lower opening edge.

4. The panel of claim 1 further comprising a second pair of elongated tabs projecting at said second panel edge.

5. The pane of claim 4 wherein alternating slots have an associated bifurcated vane structure projecting at said second edge, the terminal ends of said second tabs and said vane structures substantially aligning.

6. The grid strip of claim 1 wherein said weld tab means comprises a pair of weld tabs disposed at opposing sides of a slot and partially defining said panel first edge.

7. The grid strip of claim 6 wherein said pair of weld tabs extend laterally away from said slot a distance which is approximately equal to one-half the distance between adjacent slots.

8. A grid strip for constructing a nuclear fuel assembly grid comprising:

a panel of substantially uniform thickness having opposing first and second edges and a medial centerline thereto;

slot means defining a plurality of slots extending from said first edge to approximately said centerline, said slots being substantially parallel and equidistantly spaced;

weld tab means comprising at least one pair of elongated weld tabs, each tab of said pair at least partially defining a said slot and said tabs of each pair being disposed on opposite sides of said slot, said tabs having an elongated strip-like configuration defined by a pair of substantially parallel edges extending substantially the longitudinal length thereof and extending vertically away from said slot a distance which is greater than or equal to one-half of the distance between adjacent slots.

9. The grid strip of claim 8 further comprising opening means defining a plurality of openings and pairs of elongated weld tabs partially defining said openings and said slots.

10. The grid strip of claim 9 wherein alternating slots have an associated bifurcated vane structure projecting at a first edge, the terminal ends of said vane structure generally aligning with terminal ends of at least one of said weld tabs.

11. A method for constructing a nuclear fuel assembly grid of the type employing a plurality of interior strips of substantially equal generally uniform thickness having upper and lower longitudinal edges which are slotted and orthogonally interengaged to define a plurality of fuel support cells comprising:

(a) forming a type A strip defining a plurality of slots extending from the lower edge to approximately the strip longitudinal centerline, said A strip comprising a projecting elongated tab integrally extending adjacent at least one said slot, said tab having an elongated strip-like configuration defined by a pair of substantially parallel edges extending substantially the longitudinal length thereof (b) forming a type B strip defining a plurality of slots extending from the upper edge to approximately the strip longitudinal centerline, said B strip comprising a projecting elongated tab integrally extending adjacent at least one said slot, said tab having an elongated strip-like configuration defined by a pair of substantially parallel edges extending substantially the longitudinal length thereof;

(c) orthogonally engaging the A strips and the B strips by congruent overlapping of respective sots;

(d) bending the tabs so as to engage the respective strips adjacent the intersection with said orthogonal strip; and (e) welding said tabs to interlock said type A and type B strips.

12. The method of claim 11 wherein the bent tabs of step (d) form an elongated structure which extends substantially the entire intersection of an engaged type A strip and a type B strip.

13. The method of claim 11 wherein in step (d) at least one elongated welding tab has a longitudinal axis which is rotated approximately 90° to a position adjacent an intersecting strip.

14. The method of claim 11 wherein step (e) further comprises melting said tabs to form weldments.

* * * * *

UNITED STATES PATENT AND TRADEMARK OFFICE
CERTIFICATE OF CORRECTION

PATENT NO. : 5,188,797
DATED : February 23, 1993
INVENTOR(S) : William J. Bryan It is certified that error appears in the above-identified patent and that said Letters Patent is hereby corrected as shown below:

In column 7, line 4, after "slots" insert --, each slot having a width and--; line 12, after "configuration" insert --with a width substantially equal to the width of a slot, as--; line 14, delete "thereof" and insert in place thereof --of the tab--; line 55, before the comma insert --thereby defining a slot width--; line 56, after "configuration" insert --with a width substantially equal to the width of a slot, as--.

In column 8, line 3, delete "thereof" and insert in place thereof --of the tab--; line 25, change the comma to a semicolon and delete "said tab"; delete lines 26 through 29; line 34, change the comma to a semicolon and delete "said tab"; delete lines 35 through 38; line 40, delete "sots" and insert in place thereof --slots to form lines of intersection--; delete lines 41 through 43 and insert in place thereof --(d) bending each tab of one type of strip at least 90° so as to engage an orthogonal strip at a line of intersection; and--; line 44, after "to" insert --the strips to--.

Signed and Sealed this

Twenty-eighth Day of December, 1993

Attest:

BRUCE LEHMAN

*Attesting Officer*   *Commissioner of Patents and Trademarks*